United States Patent [19]

Lefèvre et al.

[11] Patent Number: 4,928,005
[45] Date of Patent: May 22, 1990

[54] MULTIPLE-POINT TEMPERATURE SENSOR USING OPTIC FIBERS

[75] Inventors: Hervé Lefèvre, Paris; Jean-Pierre Bettini, Perthes; Serge Botti, Viroflay; Marc Turpin, Bure sur Yvette, all of France

[73] Assignee: Thomson-CSF, Paris, France

[21] Appl. No.: 300,926

[22] Filed: Jan. 24, 1989

[30] Foreign Application Priority Data

Jan. 25, 1988 [FR] France .................. 88 00780

[51] Int. Cl.⁵ .................. H01J 5/16; H01J 40/14
[52] U.S. Cl. .................. 250/227.23; 250/227.24; 250/227.31; 356/345; 356/346
[58] Field of Search .................. 250/227, 231 R, 225; 350/96.15; 356/345, 346, 351

[56] References Cited

U.S. PATENT DOCUMENTS

| 4,699,513 | 10/1987 | Brooks et al. | 356/345 |
| 4,861,979 | 8/1989 | Tardy et al. | 250/227 |
| 4,867,565 | 9/1989 | Legnime | 356/351 |

FOREIGN PATENT DOCUMENTS 2189880 11/1987 United Kingdom .

OTHER PUBLICATIONS

Electronics Letters, vol. 21, No. 4, Feb. 14, 1985, pp. 148–149, Stevenage, Herts, GB; M. Courke et al.
Journal of Lightwave Technology, vol. LT-5, No. 7, Jul. 1987, pp. 932–940, IEEE, New York, N.Y., U.S.; I. Sakai et al.

Primary Examiner—David C. Nelms
Assistant Examiner—George C. Beck
Attorney, Agent, or Firm—Oblon, Spivak, McClelland, Maier & Neustadt

[57] ABSTRACT

A multiple-point temperature sensor, with optic fibers, uses the effect of variation in the birefringence in a birefringent optic fiber as a function of temperature. This sensor has a plane polarized, wide spectrum source coupled to a monomode optic fiber for preservation of polarization, along one of the neutral axes, with weak coupling points distributed along this fiber. A polarizer at 45° to the neutral axes of the fiber is placed at the output of this sensing fiber. The output radiation is analyzed by spectroscopy, for example in a Michelson interferometer, capable of being swept, associated with a detector. The interferometer shifts needed to detect the extreme values of the transmission function are measurements of temperature deviations.

6 Claims, 2 Drawing Sheets

MULTIPLE-POINT TEMPERATURE SENSOR USING OPTIC FIBERS

BACKGROUND OF THE INVENTION

1. Field of the Invention.

The invention relates to a temperature sensor using optic fibers and to their properties whereby they have birefringence which varies as a function of temperature.

2. Description of the Prior Art

A linear polarization preserving monomode fiber is obtained by creating a high degree of elasto-optical birefringence, using a zone that sets up intrinsic stresses, in a monomode fiber A standard example of a fiber of this type has the following structure: two very highly doped bars are placed on either side of the core. During the fiber-drawing process, the different glasses are first viscous and then get solidified. In cooling down to ambient temperature, the doped bars, which have a thermal expansion coefficient far greater than that of the rest of the structure, get contracted and therefore place the region of the core under elongation stress By elasto-optical effect, this stress creates birefringence.

This birefringence is often defined by the beat length $L_B$, namely the length at the end of which the polarizations along the two neutral and orthogonal axes of the fiber have become phase-shifted by $2\pi$ rad. This length is typically of the order of 1 to 5 mm. The origin of this stress is, therefore, the cooling of the non-homogenous structure and depends on the temperature. This dependence is of the order of $10^{-3}/°$ C.

SUMMARY OF THE INVENTION

The temperature of the multiple-point temperature sensor, with optic fibers, according to the invention, uses this property of variation in birefringence as a function of temperature to enable the measurement of temperature.

According to the invention, a multiple point temperature sensor using optic fibers comprises:

a wide band optical source, of the super-luminescent diode type, for example, which is plane polarized and may be pulse modulated;

A birefringent, monomode, sensing optic fiber on which there have been created localized, weak coupling points, spaced out along the fiber, the input face of which is coupled to the source, the polarization axis of the source being aligned with a neutral axis of the fiber;

polarization means coupled to the output face of the fiber, to align the polarizations of the waves transmitted by the fiber (and make their interference possible);

a device for spectroscopic analysis, coupled to the output of the polarization means, to analyse the radiation transmitted and to form the transmission function of the sensor;

and processing means which, using the transmission function, extract the measurements of the temperatures of the segments of fibers between coupling points

BRIEF DESCRIPTION OF THE DRAWINGS

The invention will be better understood, and other of its characteristics will appear in the following description, made with reference to the appended figures, of which.

DESCRIPTION OF THE PREFERRED EMBODIMENTS

If we consider an optic fiber in which the beat length $L_B$ is equal to 1 mm, there are 1000 $L_B$ for one meter of fiber, and when the thermal dependence of the birefringence is $10^{-3}/°$ C., a variation of 1° C. produces an output phase shift variation between the two inherent polarizations, equal to $2\pi$ rad and corresponding to a shift of one fringe if interferences are created between these two waves.

Figure 1:
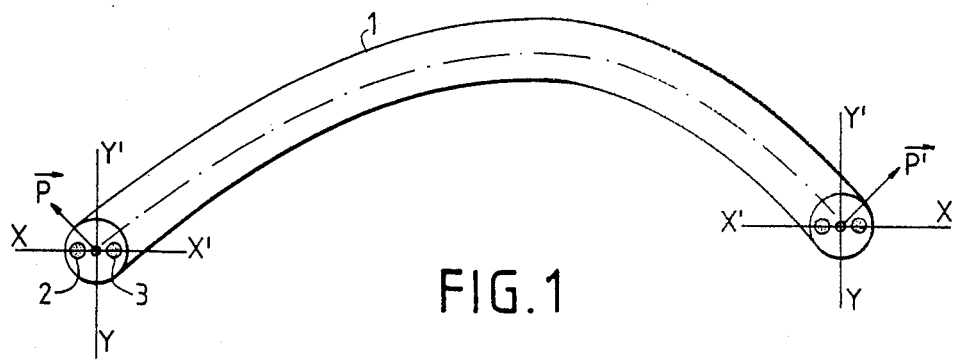
FIG. 1 is a drawing illustrating the working of a birefringent, optic fiber as an interferometer.

This effect is, therefore, highly perceptible and can be measured in an interferometrical assembly FIG. 1 shows a polarization maintaining, monomode optic fiber 1, for which the birefringence is obtained by means of two highly doped stress bars 2 and 3, which determine the directions of the two neutral axes $XX'$ and $YY'$ of the fiber. When a fiber of this type receives a radiation which is polarized along $\vec{P}$, at 45° to the neutral axes of the fiber, and which therefore gets distributed equally between the slow mode and the fast mode, corresponding to two neutral axes, the two waves get propagated at different speeds owing to the birefringence. At the output of the fiber, the two modes can be recombined by means of a polarizer at 45° to the two neutral axes, along $\vec{P}$.

In an assembly of this type, as in a standard interferometer with two distinct paths, the output power of the radiation varies as a function of the cosine of the phase shift between the two modes, and hence as a function of the temperature.

Figure 2:
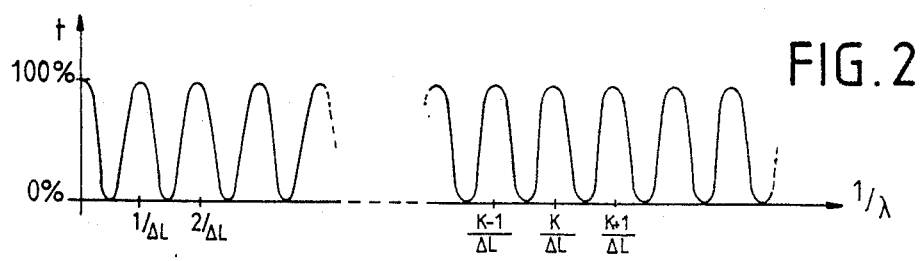
FIG. 2 represents the transmission relationship, as a function of the wavelength of an interferometer of this type.

This system also has chromatic filtering properties. For, if there were no dispersal, the birefringence would create a difference in optical path $\Delta l$ between the two inherent modes: the light is transmitted if $\Delta l = k\lambda$ and extinguished if $\Delta l = (2k+1)\lambda/2$ where $\lambda$ is the wavelength of the optical radiation. The corresponding relationship of transmission, as a function of $1/\lambda$, is shown in FIG. 2.

When the birefringence varies, the relationship of transmission gets shifted: if the system is analyzed with a monochromatic streak having a wavelength $\lambda_o$, the result is obtained by which, in making the birefringence vary, the transmission at a given wavelength $\lambda_o$ varies according to a sinusoidal relationship.

Figure 3:
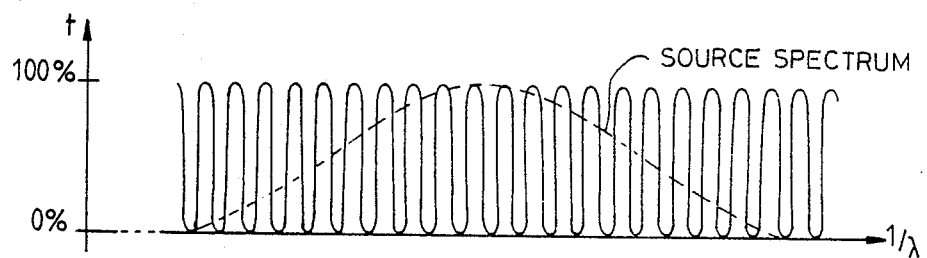
FIG. 3 represents the spectrum of a wide source and the transmission relationship as a function of the converse of the wavelength, of the interferometer.

If, instead of being a monochromatic source, the source is a wide spectrum one, the ridges of the transmission function will be far narrower. At the output, therefore, there is obtained the product of the transmission relationship ridged by the spectrum of the source, namely, a ridged spectrum which can be analyzed by all the standard methods of spectroscopy such as those using dispersive prisms, lattices, spectroscopy by Fourier transform, etc. The spectrum of a wide band source and the ridged transmission relationship are shown in FIG. 3, as a function of $1/\lambda$.

Spectroscopy by Fourier transform, in particular, uses an interferometer, the working difference of which is made to vary: a signal is found when the shift between the two arms of the interferometer correponds to the pitch of the ridges (as a function of the frequencies), i.e. when this shift compensates for that of the first interferometer for which the transmission function is analyzed.

For the viewpoint of the analysis, placing two interferometers with similar shifts amounts to placing two filters, having identical ridge pitches, in parallel; when they are in coincidence, the light goes through, but there is a minimum degree of transmission when they are in anti-coincidence.

The multiple-point temperature sensor according to the invention uses a pulse-modulated, plane polarized, wide spectrum source of this type, coupled with a birefringent, monomode fiber, along the axis of birefrigence. Weak coupling points are distributed along the fiber. If the wave train is coupled in the fast mode at input, there will be, at output, a wave train that has remained in the fast mode, and a series of wave trains in the slow mode, created at the different coupling points. The localized couplings, distributed along the fiber, are weak so as to make it possible to overlook the wave trains coming from multiple couplings, for example the wave train coupled in slow mode to the first coupling point and re-coupled, in the slow mode, to the following coupling point etc.

Figure 4:
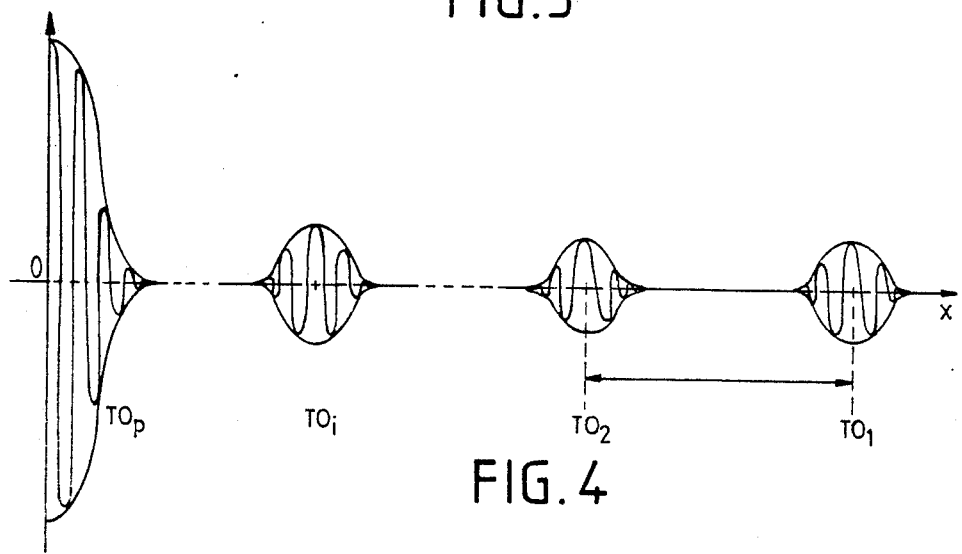
FIG. 4 illustrates the wave trains at the output of the polarizer placed at the output of a birefringent, sensing fiber comprising several coupling points.

A polarizer at 45° to the neutral axes, placed at the output of the fiber, enables the realignment, in the same polarization state, of the main wave train $TO_p$ and the wave trains coupled to the points $M_1, M_2,...M_1$, respectively $TO_1, TO_2...,TO_1$. FIG. 4 shows these wave trains successively detected as a function of the shift x of a interferometer capable of being swept. The shft between the main wave train $TO_p$ and a wave train which is coupled, i.e. $TO_1$, depends on the birefringence between the coupling point M1 and the end of the fiber.

By difference, the distance between the wave trains $TO_1$ and $TO_{i+1}$ corresponds to the birefringence between the coupling points $M_1$ and $M_{i+1}$, this birefrigence being itself a function of the temperature of the fiber segment $M_1, M_{i+1}$.

The intensity of the couplings at the coupling points $M_1$ does not come into play. The only factor that counts is the distance between these two points, the shifts between wave trains being directly proportionate to the temperature deviations A particularly advantageous approach is to have evenly spaced out points $M_1$.

This system with several coupling points has a transmission with ridges in the spectrum, the spatial frequencies of the ridges created by the different points being different. Since the couplings are weak, the extinguishing is not complete, i.e. a value of zero is never obtained in the transmission function The analysis of the transmission function of a complex "filter" relationship of this type thus enables the analysis of the birefringence and, therefore, of the temperature of each segment $M_1, M_{i+1}$.

A method of analysis by spectroscopy, which is well suited to this case, lies in the use of a Michelson interferometer, capable of being swept.

An advantageous method to make the coupling points consists in twisting the fiber elastically, and then in heating it locally by means of an electric arc, a torch or a laser source. The torsion gets relaxed at the heating point, thus creating a rotation of the neutral axes and, hence, a localized coupling, without, thereby, in any way inducing losses since the fiber core has not been interrupted.

Figure 5:
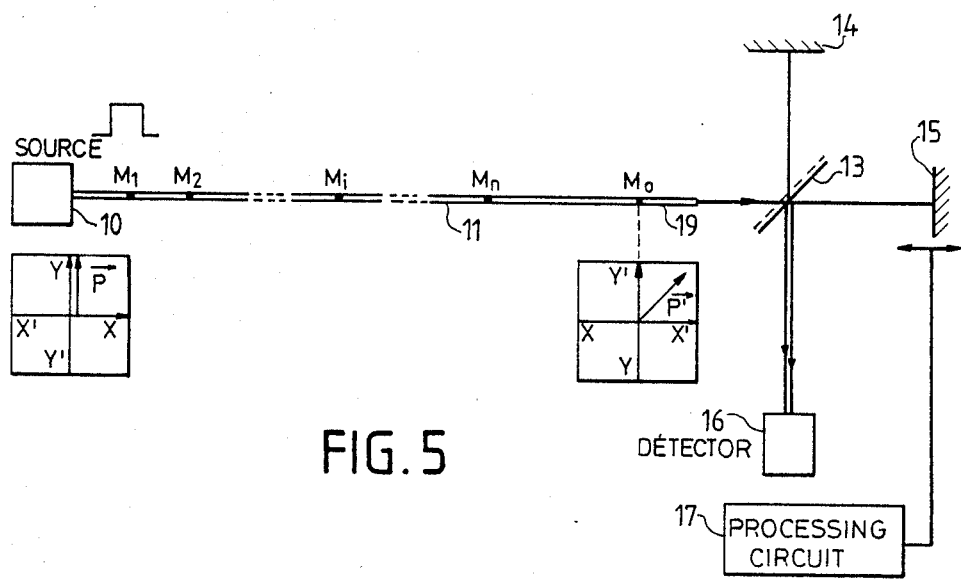
FIG. 5 represents a first embodiment of the sensor according to the invention.

FIG. 5 is a diagram of a first embodiment of the multiple-point temperature sensor, using optic fibers, according to the invention.

The wide spectrum source 10, of the super-luminescent diode type, plane polarized by construction, or associated with a polarizer, is coupled along an axis of birefringence, with the fast axis being coupled, for example, to a birefringent optical axis 11 comprising a certain number of localized, weak coupling points $M_1$, $M_2...M_1$... A polarizer 19 is coupled to the output of the fiber at 45° to the neutral axes of this fiber, to align the wave trains. The light coming from this polarizer is then transmitted to a Michelson interferometer, capable of being swept, comprising a separating element 13 and two returning mirrors, 14 and 15, which respectively receive the waves transmitted and reflected by the separator. One of the mirrors 15 can be shifted along the optical axis of the beam which it receives, and this shift enables the appearance, at a detector 16, of the maximum values of the transmission function, the spacing of which is as indicated above, as a function of the temperature. A processing circuit 17 transforms the shifts into measurements of temperature.

Figure 6:
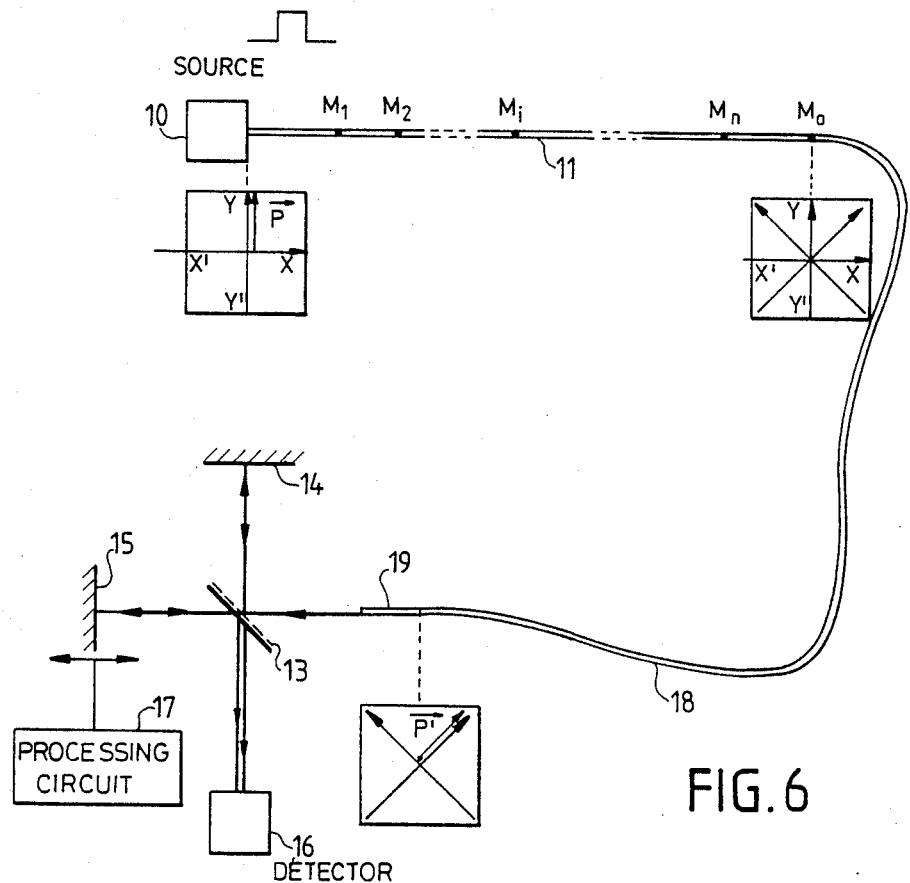
FIG. 6 represents a second embodiment of the sensor according to the invention.

The invention is not restricted to the above-described embodiment. In particular, it may be worthwhile to move the sensing fiber to a distance from the detecting and measuring means rather than to place them at the output of the sensing fiber. For this purpose, as shown in FIG. 6 where the same references are repeated for the same elements, to the output face of the sensing fiber, there is connected a polarization preserving fiber 18 with an axis at 45° to the neutral axes of the sensing fiber and a polarizer 19 is placed at the end of this reflecting fiber, this polarizer 19 being aligned with the neutral axes of the polarization preserving fiber. The set formed by the fiber 18 and the polarizer 19 is equivalent to the polarizer 19, of FIG. 5. This embodiment enables the fiber sensor part to be moved away from the detecting and measuring means.

Besides, the wide spectrum source may be either a super-luminescent diode ("SLD") as indicated above, or a laser source wherein the spectrum is widened artificially.

This type of temperature sensor can function for temperatures varying between −20° C. and +100° C. when the fiber has an acrylate coating, for it would not withstand higher temperatures. On the contrary, for polyimide coatings, the temperature range may be widened to between −100° C. and +300° C. In this range, the variations induced are linear and without hysteresis. Other adapted coatings should enable considerable widening of the temperature range.

To obtain measurable energy, it is possible to use 100 coupling points at 30 dB for example: this gives one-thousandth of the intensity for each rise following the main pulse in which approximately 90% of the energy is recovered. The energy can be likened to a coherent detection where a small pulse "beats" with the main pulse, correponding to the main wave train. For example, a 100 $\mu$W source creating, at a coupling point, a 0.1 $\mu$W coupling in the other mode, suffices to perform the detection efficiently.

To check the temperature on 20m., it is possible to space out the coupling points by 20 cm. for example or, to check the temperature on 300 m., it is possible to space to the 100 coupling points by 3 m.

The invention can be applied notably, but not exclusively, to the checking of temperature on great lengths or in big volumes.

For the analysis of the relationship of transmission, with $10^3$ fringes $L_B$ for 1 m, the shift of the interferometer may be 0.5 mm. for a shift by one fringe, namely 5 cm. to see 100 fringes (owing to the to-and-fro path of the light via the mirror).

The invention is not restricted to the above-described embodiments. In particular, the coupling points could be created by other methods, inasmuch as they are created at well localized, fixed points and inasmuch as they do not destroy the continuity of the core of this fiber.

What is claimed is:

1. A multiple-point temperature sensor using optic fibers, comprising:

a wide band optical source, of the pulse-modulated, plane polarized, super-luminescent diode type;

A birefringent, monomode, sensing optic fiber on which there have been created localized, weak coupling points, spaced out along the fiber, the input face of which is coupled to the source, the polarization axis of the source being aligned with a neutral axis of the fiber;

polarization means coupled to the output face of the fiber, to align the polarizations of the waves transmitted by the fiber (and make their interference possible);

a device for spectroscopic analysis, coupled to the output of the polarization means, to analyse the radiation transmitted and to form the transmission function of the sensor;

and processing means which, using the transmission function, extract the measurements of the temperatures of the segments of fibers between coupling points 2. A sensor according to claim 1, wherein the polarization means are formed by a fiber polarizer, directly coupled to the sensing fiber with an axis at 45° to the neutral axis of the sensing fiber.

3. A sensor according to claim 1, wherein the polarization means comprise a polarization preserving optic fiber coupled to the output face of the sensing fiber, its axes being oriented at 45° to the axes of birefringence of the sensing fiber, and an output polarizer, coupled to the polarization preserving fiber, with an axis that is the same as a neutral axis of this fiber.

4. A sensor according to claim 1, wherein the localized coupling points are created on the fiber by elastic torsion and then local heating which relaxes the torsion.

5. A sensor according to claim 1, wherein the device for analysis by spectroscopy is a Michelson interferometer, one returning mirror of which can be shifted along the optical axis of the radiation which it receives.

6. A sensor according to claim 1, wherein the coupling points are evenly spaced out on the sensing fiber.

* * * * *